United States Patent
Embree (10) Patent No.: US 7,792,763 B2
(45) Date of Patent: Sep. 7, 2010

(54) METHOD AND SYSTEM TO DETECT OUTLYING BEHAVIOR IN A NETWORK-BASED MARKETPLACE

(75) Inventor: Kevin Embree, Austin, TX (US)

(73) Assignee: eBay Inc., San Jose, CA (US)

( * ) Notice: Subject to any disclaimer, the term of this patent is extended or adjusted under 35 U.S.C. 154(b) by 1350 days.

(21) Appl. No.: 10/822,894

(22) Filed: Apr. 12, 2004

(65) Prior Publication Data

US 2005/0228722 A1 Oct. 13, 2005

(51) Int. Cl.
*G06Q 10/00* (2006.01)
*G06Q 30/00* (2006.01)

(52) U.S. Cl. ........................................ 705/347; 705/1.1
(58) Field of Classification Search .................. 705/1
See application file for complete search history.

(56) References Cited

U.S. PATENT DOCUMENTS

| | | | |
|---|---|---|---|
| 5,895,453 A | 4/1999 | Cook | |
| 6,122,624 A | 9/2000 | Tetro et al. | |
| 6,877,034 B1* | 4/2005 | Machin et al. | 709/223 |
| 7,096,192 B1 | 8/2006 | Pettitt | |
| 7,162,494 B2* | 1/2007 | Arellano | 707/104.1 |
| 7,165,051 B2 | 1/2007 | Ronning et al. | |
| 7,493,281 B2 | 2/2009 | Vogel et al. | |
| 2002/0013760 A1* | 1/2002 | Arora et al. | 705/37 |
| 2002/0059130 A1* | 5/2002 | Cheng et al. | 705/37 |
| 2004/0098333 A1* | 5/2004 | Meesseman | 705/37 |
| 2005/0144052 A1* | 6/2005 | Harding et al. | 705/7 |
| 2005/0240481 A1 | 10/2005 | Vogel et al. | |
| 2009/0150202 A1 | 6/2009 | Vogel et al. | |

OTHER PUBLICATIONS www.amazon.com. Oct. 18, 2000.*
U.S. Appl. No. 11/158,651 Notice of Allowance Mailed on Oct. 8, 2008, 9 Pgs.
U.S. Appl. No. 11/158,651 Non-Final Office Action mailed Jun. 26, 2008, 4 pgs.
U.S. Appl. No. 11/158,651 Response filed Sep. 16, 2008 to Non-Final Office Action mailed Jun. 26, 2008, 8 pgs.

* cited by examiner

*Primary Examiner*—John G Weiss
*Assistant Examiner*—Candice D Carter
(74) *Attorney, Agent, or Firm*—Schwegman, Lundberg & Woessner, P.A.

(57) ABSTRACT

A system to detect outlying behavior in a network-based marketplace automatically collects attribute information for a first plurality of sellers that includes a first seller, and stores the attribute information in a storage device. The system computes peer information associated with a second plurality of sellers using a computer system, wherein the first plurality of sellers includes the second plurality of sellers, and wherein the peer information is automatically computed from the attribute information for the second plurality of sellers. The system compares the peer information associated with the second plurality of sellers with attribute information for the first seller for the purpose of automatically detecting outlying behavior by the first seller.

19 Claims, 10 Drawing Sheets

USER ATTRIBUTES TABLE

FEEDBACK FEEDBACK SCORE
FEEDBACK PERCENT INCREASE
NEGATIVE FEEDBACK
NEUTRAL FEEDBACK
EVENTS CONTACT INFORMATION CHANGED
BILLING INFORMATION CHANGED
CHECKING ACCNT INFORMATION CHANGED
CREDIT CARD DECLINE
OPEN TOTAL LISTING COUNT
TOTAL QUANTITY AVAILABLE
AVERAGE SALES PRICE
LISTING FEES
FRAUD CLAIMS
CLOSED TOTAL LISTING COUNT
SUCCESSFUL LISTINGS
LISTING CONVERSION RATE
TOTAL QUANTITY AVAILABLE
TOTAL QUANTITY SOLD
QUANTITY CONVERSION RATE
GROS MERCHANDISE SALES
AVERAGE SALES PRICE
LISTING FEES
TOTAL BIDS
TOTAL UNIQUE BIDDERS
NUMBER OF DUTCH AUCTIONS
NUMBER OF BUY IT NOWS
FRAUD CLAIMS PAID
FRAUD CLAIMS NOT PAID

User ID: John Doe(jdoe@aol.com)(private)   188   186
Show [3 ▽] Weeks back
192

| Weekly Summary | Feb-24-02-Mar-02-02 | Feb-17-02-feb-02 | Feb-10-02-Feb-16-02 |
|---|---|---|---|
| Week In Year | 2002W09 | 2002W08 | 2002W07 |
| Feedback | | | |
| Feedback Score | 100 | 50 | 10 |
| FB % increase | 100% | 80% | 0% |
| Negative FB | 4 | 0 | 0 |
| Neutral FB | 0 | 0 | 0 |
| Events | | | |
| Contact Info Changed | Yes | No | No |
| Billing Info Changed | Yes | No | No |
| Checking Acct Info Changed | Yes | No | No |
| Credit Card Decline | Yes | No | No |
| Open | | | |
| Total Listing count | 3 | 2 | 0 |
| Total Qty Available | 3 | 2 | 0 |
| ASP | $3.00 | $4.00 | $0.00 |
| Listing Fees | $0.00 | -$1.00 | $0.00 |
| FPP - Open | 7 | 0 | 0 |
| Closed | | | |
| Total Listing count | 3 | 2 | 0 |
| Successful Listings | 1 | 1 | 0 |
| Listings-conversion rate | 33% | 50% | 0% |
| Total Qty Available | 3 | 2 | 0 |
| Total Quantity sold | 1 | 1 | 0 |
| QTY - conversion rate | 33% | 50% | 0% |
| GMS | $3.00 | $8.00 | $0.00 |
| ASP | $3.00 | $4.00 | $0.00 |
| Listing Fees | $0.00 | -$1.00 | $0.00 |
| Total Bids | 1 | 2 | 0 |
| Total Unique Bidders | 1 | 1 | 0 |
| Number of Dutch auctions | 0 | 0 | 0 |
| Number of Bin | 0 | 0 | 0 |
| FPP - Paid | 0 | 0 | 0 |
| FPP - Other | 0 | 0 | 0 |

FIG. 8

REFERRAL LIST

CATEGORY: CAR STEREOS

ATTRIBUTE: CLOSED GMS

PEER GROUP: AVERAGE SELLERS

| USER ID | RESULTS |
|---|---|
| John Doe | 6 |
| Jean Doe | 2 |
| Julian Doe | 1 |
| Jason Doe | 1 |

METHOD AND SYSTEM TO DETECT OUTLYING BEHAVIOR IN A NETWORK-BASED MARKETPLACE

FIELD OF THE INVENTION

The present invention relates generally to the technical field of commerce automation and, in one exemplary embodiment, to methods and systems to detect outlying behavior in a network-based marketplace.

BACKGROUND OF THE INVENTION

An operator of a network-based marketplace may be interested in the behavior of buyers and sellers that conduct commerce within a network-based marketplace. For example, the operator may be interested in identifying a seller that consistently sells a high volume of goods. One reason might be to encourage such behavior by providing a reward. Another reason might be to categorize the seller as one that should receive VIP service. As another example, the operator may be interested in identifying fraudulent activity in the network-based marketplace. The operator has good reason to remove the offending party because identification and removal of the user may increase the overall trust and safety for all buyers and sellers in the network-based marketplace.

Operators face technical challenges in identifying outlying behavior in a network-based marketplace. One approach for identifying outlying behavior has been to establish a rules base system. The behavior of buyers and sellers are compared against the rules to detect outlying behavior. Operators will usually have some immediate success with such systems but have found, by experience, that the effectiveness of a rules base system will typically diminish with time. For example, a rules based system to identify fraudulent activity will decrease in effectiveness as the perpetrators of the fraudulent activity become aware of the rules and adjust their behavior to avoid detection.

SUMMARY OF THE INVENTION

According to one aspect of the present invention, there is provided a method and a system to detect outlying behavior in a network-based marketplace. The method includes automatically collecting attribute information for a first plurality of sellers that includes a first seller and storing the attribute information in a storage device. Peer information, associated with a second plurality of sellers using a computer system, is automatically computed. The first plurality of sellers includes the second plurality of sellers, and the peer information is automatically computed from the attribute information for the second plurality of sellers. The peer information, which is automatically computed for the second plurality of sellers, is automatically compared with attribute information that is for the first seller; and outlying behavior by the first seller is automatically detected based on the comparison.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to detect outlying behavior in a network-based marketplace are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a system for collecting different types of attribute information about sellers on a regular (e.g., weekly) basis. The system uses the attribute information to compute peer information for different peer groups. The peer information establishes so called "normal behavior" for the peer group in the form of a standard deviation. Finally, the system compares the behavior of the sellers, as characterized by the attribute information, with the "normal behavior" of an appropriate peer group to detect outlying behavior. Thus, the individual seller is compared against "normal behavior" that is dynamically established and categorized with respect to a peer group that is appropriate for the seller.

Platform Architecture

Figure 1:
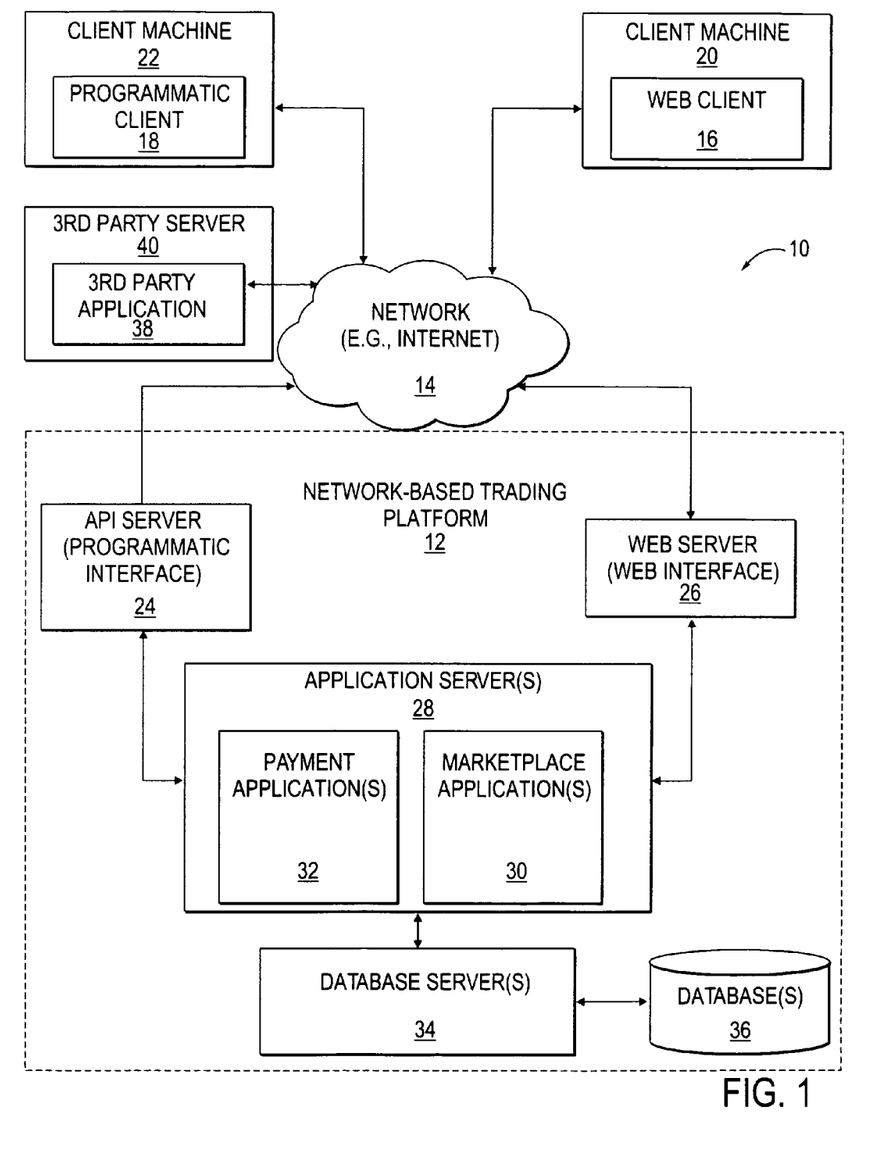
FIG. 1 is a network diagram depicting a system, according to one exemplary embodiment of the present invention.

FIG. 1 is a network diagram depicting a system 10, according to one exemplary embodiment of the present invention, having a client-server architecture. A commerce platform, in the exemplary form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the network-based marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
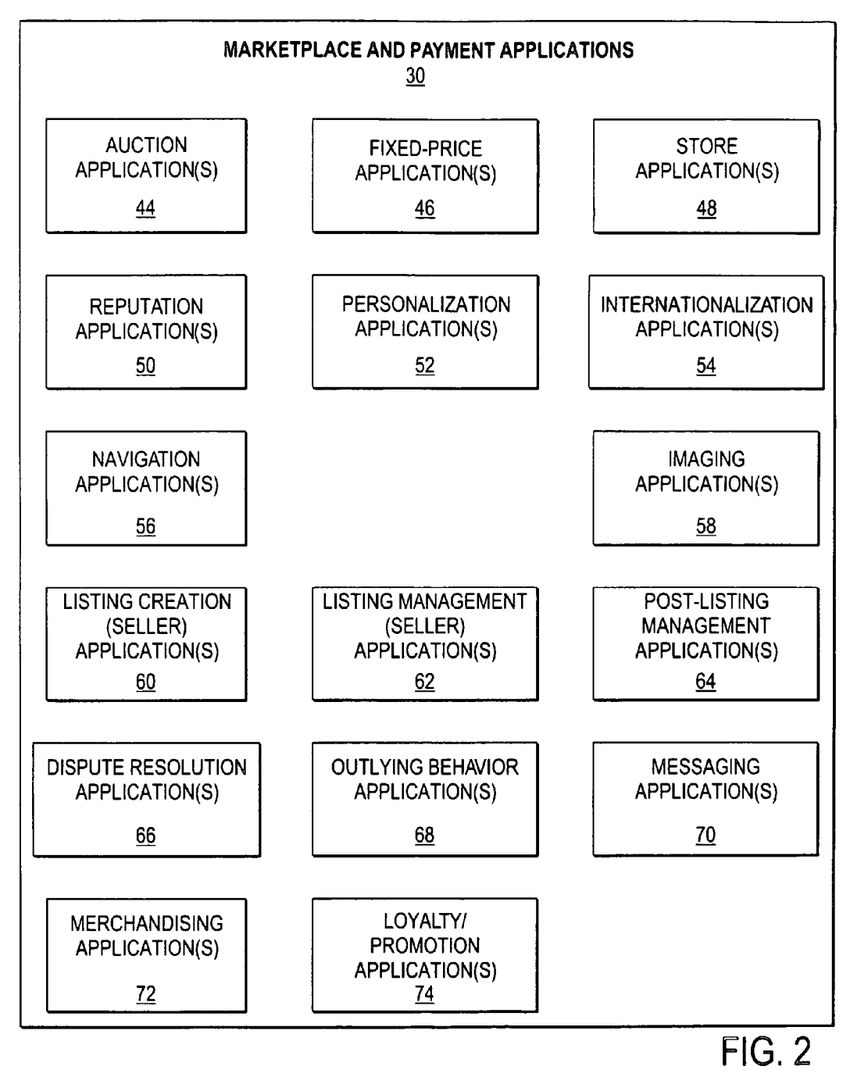
FIG. 2 is a block diagram illustrating multiple marketplace and payment applications that, in one exemplary embodiment of the present invention, are provided as part of the network-based marketplace.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a buyer may wish to leave feedback regarding a particular seller. To this end, a post-listing management application 64 may provide an interface to one or more reputation applications 50, so as to allow the buyer to conveniently to provide feedback regarding a seller to the reputation applications 50. Feedback may take the form of a review that is registered as a positive comment, a neutral comment or a negative comment. Further, points may be associated with each form of comment (e.g., +1 point for each positive comment, 0 for each neutral comment, and −1 for each negative comment) and summed to generate a rating for the seller.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of outlying behavior applications 68 implement various fraud detection and prevention mechanisms to reduce the occurrence of fraud within the marketplace 12, and customer segmentation mechanisms to identify and classify high value users.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 3:
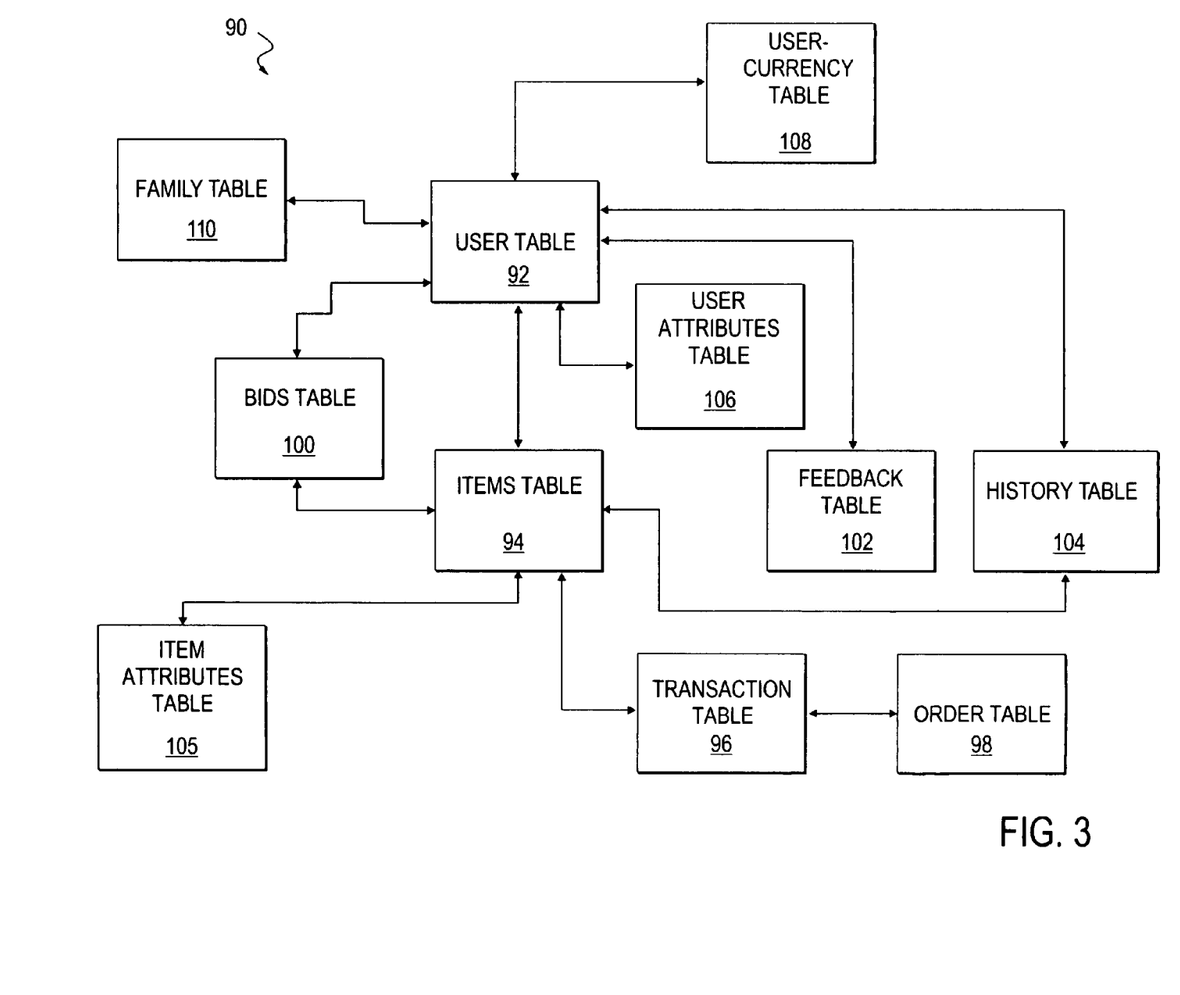
FIG. 3 is a high-level entity-relationship diagram, illustrating various tables that are utilized by and support the network-based marketplace and payment applications, according to an exemplary embodiment of the present invention.

FIG. 3 is a high-level entity-relationship diagram, illustrating various tables 90 that may be maintained within the databases 36, and that are utilized by and support the marketplace and payment applications 30 and 32. While the exemplary embodiment of the present invention is described as being at least partially implemented utilizing a relational database, other embodiments may utilize other database architectures (e.g., an object-oriented database schema).

A user table 92 contains a record for each registered user of the network-based marketplace 12, and may include identifier, address and financial instrument information pertaining to each such registered user. A user may operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables including an item attributes table 105 that records attribute information pertaining to items for which records exist within the items table 94 and a user attributes table 106 that records attribute information pertaining to users for which records exist within the user table 92.

Figure 4:
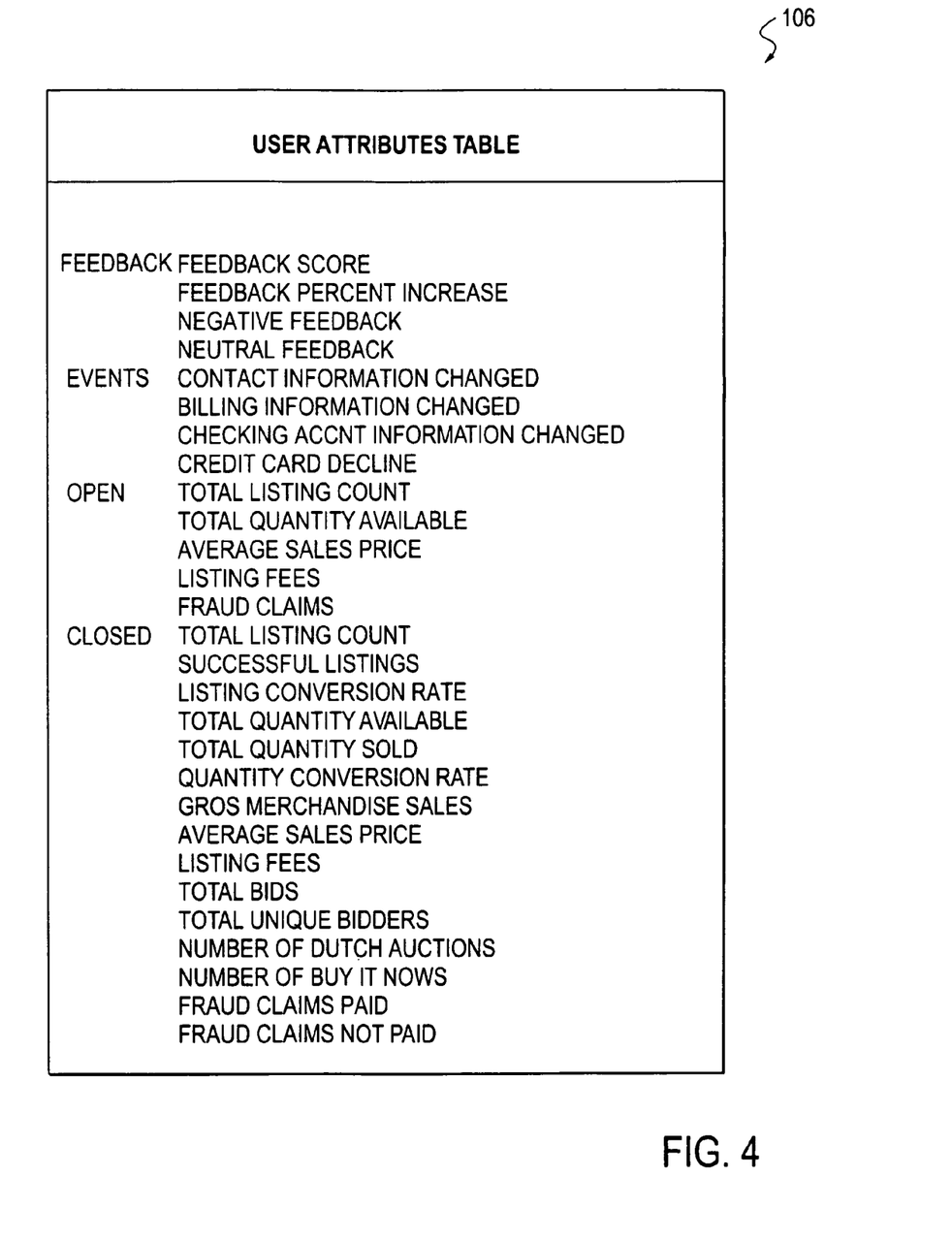
FIG. 4 is a block diagram illustrating an attributes table, according to an exemplary embodiment of the present invention.

FIG. 4 is a block diagram further illustrating a user attributes table 106, according to an exemplary embodiment of the present invention. The user attributes table 106 is a repository of attribute information that is periodically updated (e.g., hourly, daily, weekly, etc.) by collecting attribute information from other tables in the database 36. For example, the number of fraud claims filed against a particular seller may be collected at the end of every week (e.g., current time period) and stored in the user attributes table 106. The user attributes table 106 includes broad categories of attribute information including attribute information associated with feedback, attribute information associated with events, attribute information associated with opening a listing, and attribute information associated with closing a listing. The user attribute table 106 may be organized as sets of attribute information, each set corresponding to a seller for a fixed period of time.

The feedback attribute information includes a feedback score 112, a feedback percent increase 114, a negative feedback 116, and a neutral feedback 118. The feedback score 112 may be computed based on the feedback received for a seller for a period of time (e.g., +1 point for each positive comment, 0 points for each neutral comment, and −1 point for each negative comment). The feedback score 112 may be positive, negative, or zero ("0"). The feedback percent increase 114 represents the increase in the feedback score 112 from the previous time period to the current time period. The negative feedback 116 is the number of negative feedback comments received on the seller from buyers for the current time period. The neutral feedback score 118 is the number of neutral feedback comments received for the seller from buyers for the current time period.

The event attribute information records a contact information changed 120, a billing information changed 122, a checking account information changed 124, and a credit card decline 126. Each of the event attributes is associated with a binary value indicating a positive or negative status for a particular time period. For example, the contact information changed 122 may be positive if for the current time period the seller had changed their contact information (e.g., a change of home telephone number, email address, shipping address, etc.). Similarly the billing information changed 122 (e.g., billing address, VISA credit card number, etc.) or checking account information changed 124 (bank account routing number, bank branch, bank name, etc.) may be positive if changed in the current time period. Finally, the credit card decline 126 may be positive if the credit card associated with the seller had been declined in the current time period.

The open attributes information records a total listing count 128, a total quantity available 130, an average sales price 140, a listing fees 142 and a fraud claims 144. The total listing count 128 is a count of listings that were opened in the current time period. A listing is opened in response to a seller making an item available for sale or auction in the network based marketplace 12. The total quantity available 130 is computed by scanning each listing opened in the current time period. For example, a seller may author one listing that makes available 50 Beanie Babies for an auction and another listing that makes available 100 Barbies for a different auction thereby resulting in a computed total quantity available 130 of one-hundred and fifty. The average sales price 140 is the average sales price for listings opened during the current time period. For example, one listing may require an initial bid of $5 and another listing may require an initial bid of $10 thereby resulting in an average sales price 140 of $7.50. The listing fees 142 is a dollar amount of total listing fees charged to the seller for listings opened in the current time period. It should be noted that the listing fees 142 will not include a fee for a listing that is opened and closed in the current time period, although such action with regard to a listing would result in recording the fee as a closed listing fees, as described below. Thus, the listing fees 142 will include only those listings that were opened and remained open during the current time period. The fraud claims 144 is a count of the number of fraud claims opened in the current time period.

The closed attributes information records a total listing count 146, a successful listings 148, a listings conversion rate 150, a total quantity available 152, a total quantity sold 154, a gross merchandising sales 156, an average sales price 158, a listing fees 160, a total bids 162, a total unique bidders 164, a number of Dutch auctions 166, a number of buy it now 168, a fraud claims paid 170, and a fraud claims not paid 172. The total listing count 146 is the total number of listings closed in the current time period. A listing may be closed with a transaction (e.g., successfully) or without a transaction (e.g., unsuccessfully). The transaction may include a bidder making the highest bid at an auction or a buyer utilizing the buy it now feature to pay a fixed price for the item. Conversely, the listing may be closed without a transaction responsive to the seller unilaterally removing the listing from the network-based marketplace 12. The listing conversion rate 150 is a percentage of total listings that closed successfully (e.g., successful listings divided by total listings for the current time period). The total quantity available 152 is computed by scanning the listings closed in the current time period and summing the quantity of items available for each listing. The total quantity sold 154 is computed by scanning the listings closed in the current time period and summing the quantity of items that were closed successfully. The quantity conversion rate 153 is computed by dividing the total quantity sold 154 by the total quantity available for the current time period. The gross merchandise sales 156 are a summation of seller revenues resulting from successful listings as recorded during the current time period. The average sales price 158 is computed by summing the sales price for each successful listing during the current time period and computing an average. The listing fees 160 for each successful listing is computed by summing the listing fee for each successful listing during the current time period. The total bids 162 is computed by summing the number of bids placed by potential buyers for each listing that was closed during the current time period. The total unique bidders 164 is computed by summing the number of unique bidders that placed one or more bids on all listings that were closed during the current time period. The number of Dutch auctions 166 is computed by summing the number of listings that closed and utilized the Dutch auction format during the current time period. The number of buy it now 168 is computed by counting the number of listings that were closed successfully using a buyout feature (, e.g., the Buy It Now feature) during the current time period. The fraud claims paid 170 is computed by counting the number of fraud claims that were paid and closed during the current time period. For example, a fraud claim may be opened by a buyer because the buyer paid for an item or service that was never received. The fraud claim may be paid responsive to the buyer producing documentation evidencing a winning bid or the purchase of an item in the network-based marketplace 12 and the payment of money to the seller. The fraud claims not paid 172 is computed by counting the number of fraud claims that were closed during the current time period but not paid.

Figure 5:
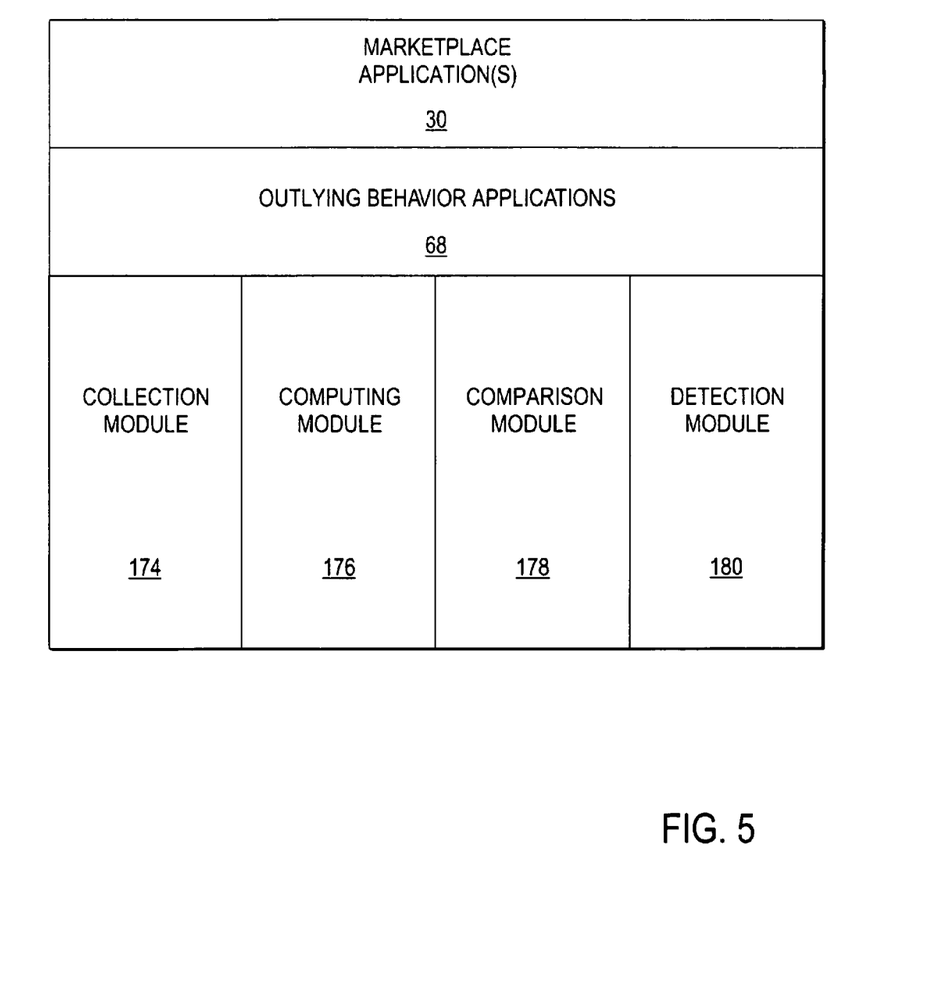
FIG. 5 is a block diagram illustrating outlying behavior applications, according to an exemplary embodiment of the present invention.

FIG. 5 is a block diagram illustrating applications to detect outlying behavior, according to an exemplary embodiment of the present invention. The outlying behavior applications 68 include a collection module 174, a computing module 176, a comparison module 178, and a detection module 180.

The collection module 174 may execute periodically or on demand to collect attribute information from the database 36 and store it in the user attribute table 106.

The computing module 176 may execute periodically or on demand to read attribute information from the user attribute table 106 and compute peer information in the form of a standard deviation and a mean for each attribute.

The comparison module 178 may execute periodically or on demand to compare attribute information for a particular seller with peer information for a particular peer group. The comparison module 78, in an exemplary embodiment, divides the standard deviation associated with a peer group into the attribute information value for a particular seller to generate a result that may be used to rank the seller behavior against other sellers in the same peer group.

The detection module 180 may execute periodically or on demand to detect outlying behavior by sorting the previously generated results into a descending or ascending order for subsequent display or reporting.

Figure 6:
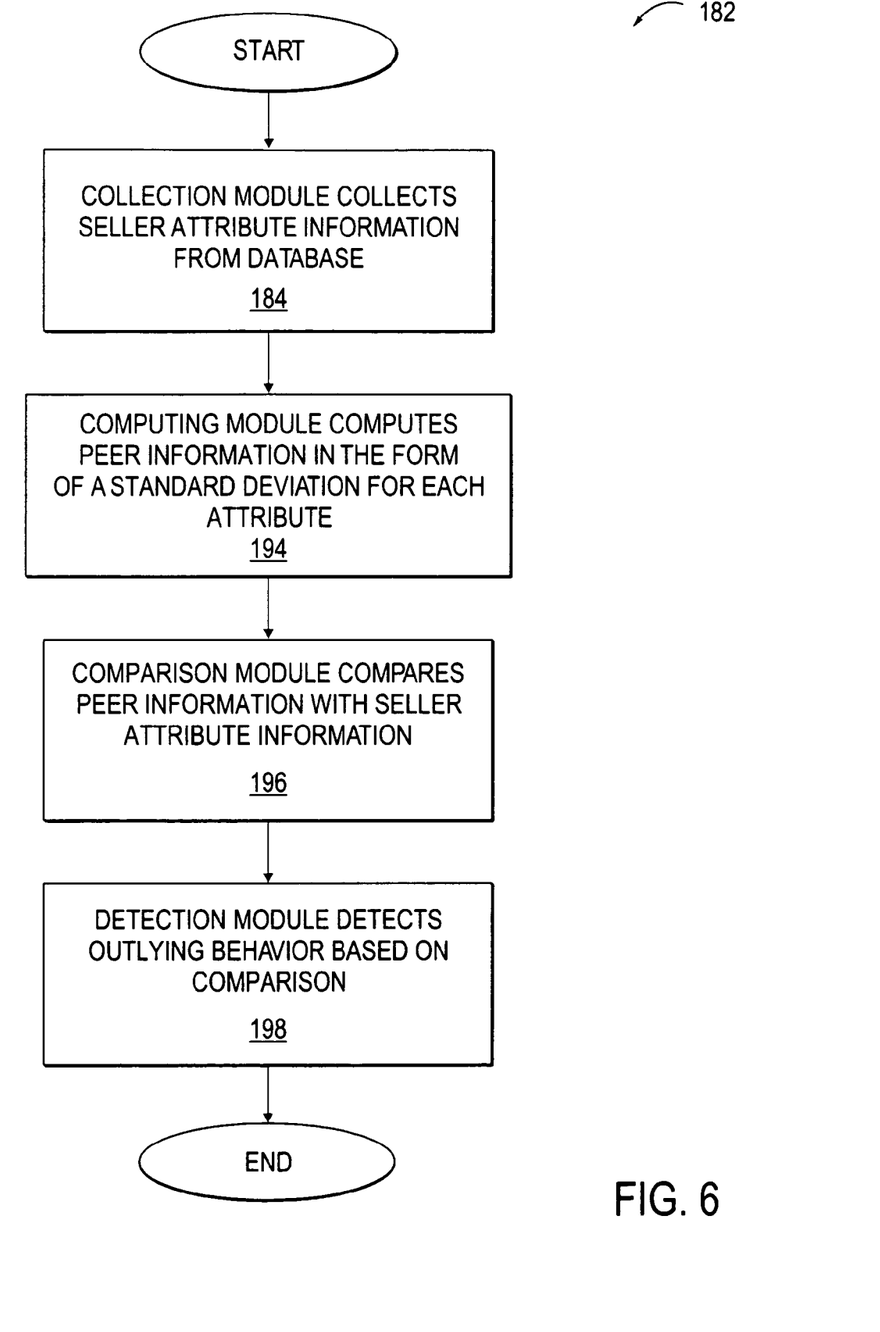
FIG. 6 is flow chart illustrating a method, according to an exemplary embodiment of the present invention, to detect outlying behavior in a network-based marketplace.

FIG. 6 is flow chart illustrating a method 182, according to an exemplary embodiment of the present invention, to detect outlying behavior in a network-based marketplace 12.

At box 184, the collection module 174 collects seller attribute information from the database 36. The collection module 174 collects attribute information and stores the attribute information in the user attributes table 106. For example, the following pseudo code may illustrate one embodiment:

```
COLLECTING (e.g., weekly Attribute Data)
    for each seller
        get attribute information
        store attribute information
```

Further, in other embodiments, the collection module 174 may identify separate user accounts as linked and store this information in the user attributes table 106. For example, two or more distinct user accounts may be "soft linked" by an administrator or "hard" linked by the collection module 174. A "hard" link is established by identifying exact matches for certain types of data that are registered to at least two accounts (e.g., the same VISA credit card number, the same checking account number for a specific bank, etc.). A "soft" link is established by identifying similarities for certain types of data that are registered to at least two accounts (e.g., similar but not identical phone numbers) or by identifying similar types of behavior (e.g. a pattern of shill bidding). Identifying user accounts as linked may enable a computer algorithm to make an automatic analysis, or an administrative personnel to make a manual analysis on a cluster of accounts. For example, the following pseudo code may illustrate one embodiment:

```
COLLECTING and LINKING (e.g., daily Account Data)
    for each registered user (sellers and buyers)
        get account information
        link account information
        store link information
```

Figure 8:
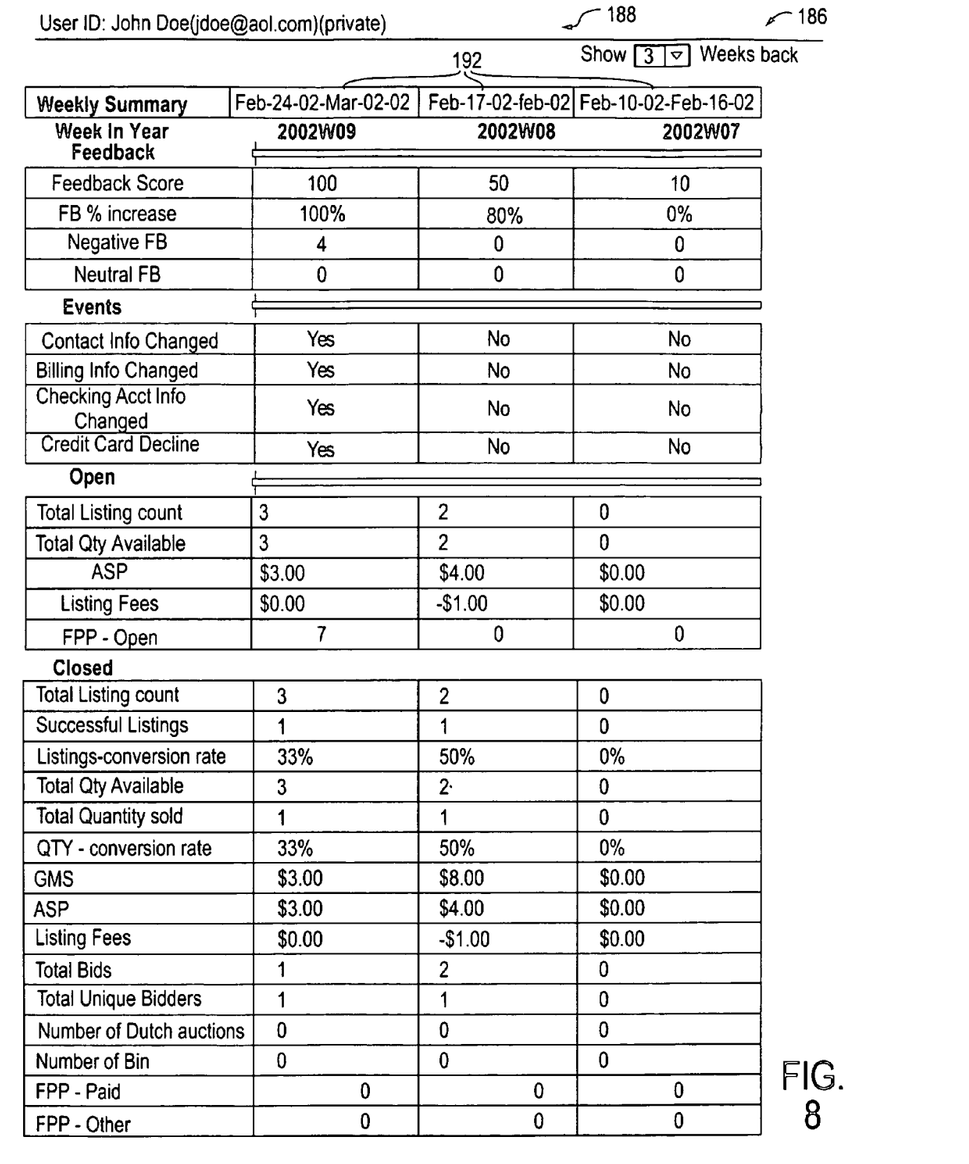
FIGS. 8-9 illustrate user interface screens, according to an exemplary embodiment of the present invention.

FIG. 8 illustrates a user interface screen 186, according to an exemplary embodiment of the present invention that may be utilized to display attribute information stored by the collection module 174 in the user attributes table 106. The user interface screen 186 includes a user ID 188 and three sets of weekly attribute information 192. The user ID 188 describes a user, John Doe, and includes his email address.

Returning to FIG. 6, at box 194, the computing module 176 computes peer information in the form of a standard deviation and a mean. A standard deviation is a statistic used to measure the dispersion in a distribution. More specifically, in the exemplary embodiment, the standard deviation measures the average value from the mean with respect to a set of values that are collected from a group of sellers. Thus, a comparison may be made between a behavior associated with an individual seller and a behavior that is, statistically, exhibited by a group of sellers. Behavior that is measured as significantly greater than corresponding group behavior may be characterized as unusual or outlying behavior. For example, an attribute value associated with a specific seller that is 3× greater than the standard deviation for a group of sellers would indicate outlying behavior with respect to the attribute in view.

The computing module 176 computes peer information by extracting the appropriate attribute values from classified sellers and computing standard deviations for the corresponding peer group. In one embodiment, a seller may be classified as an average seller or a high value seller and also according to country and utilized to compute peer information for the corresponding peer group. Other embodiments may include additional peer groups. Peer information for an average seller peer group is computed with attribute values from an average seller. An average seller is deemed as such by registering on the network-based marketplace 12 and entering a listing for sale or auction.

Peer information for a high-value (or high-volume) peer group (e.g., for a "Power Seller" peer group is computed with attribute values from a potential high-value (or high-volume) seller (conveniently hereinafter referred to as a "power seller"). The power seller is an average seller that has accepted an invitation from the network-based marketplace 12 to join a power seller peer group. For example, if the average seller exhibits behaviors that reaches or exceeds certain criteria (e.g., $200 of total gross merchandise sales for the last 4 weeks, at least 100 feedbacks, at least 75 positive feedbacks no more than 5 negative feedbacks, etc.) then the network-based marketplace 12 may invite the average seller to join a power seller peer group. In one embodiment, the network-based marketplace 12 may include multiple, differentiated power seller peer groups for the purpose of customer segmentation. For example, power seller peer groups may include Gold, Silver, Bronze power seller peer groups, where each power seller peer group is associated with a different level of invitation criteria and customer service. For example, the highest level of customer service may be extended only to those sellers that reach or exceed the highest criteria (e.g., $400 of total gross merchandise sales for the last 4 weeks, at least 200 feedbacks, at least 175 positive feedbacks no more than 10 negative feedbacks, etc.). The highest level peer group may include customer services that include expedited responses to customer service requests, free services, etc.

Peer information for a country peer group is computed from attribute information from a seller this is associated with a particular country. A seller may be classified, for example, according to country based on the name of the country provided by the seller at registration. For example, a seller that registers with a residence or business address in the England would be associated with a country classification of England. Of course, any other demographic, or determinable characteristic, may also be utilized to define peer groups.

An "all sellers" peer group includes sellers that are registered on the network-based marketplace 12 without regard to classification (power seller, registered country, etc.).

In one embodiment, the computing module 176 may extract the appropriate attribute values from each seller with an algorithm similar to the following pseudo code:

```
COMPUTING
    for each category
        for each seller
            for each attribute
                get value (e.g., Gross Merchandise Sales)
                if seller is an average seller
                    save average seller peer group value
                if seller is a power seller
                    save power seller peer group value
                save registered country peer group value based on
                    registered country of the seller
                save all sellers peer group value
```

The above pseudo code illustrates that the computing module 176 will extract an attribute value associated with a specific seller for the computation of a mean and a standard deviation for a peer group if the seller has a listing with a status of open in the category and is also a member of the peer group.

After the computing module 176 has extracted attribute values, a mean and standard deviation is computed for each peer group. For example, the following pseudo code may illustrate one embodiment:

```
for each category
    for each attribute
        compute mean & standard deviation for power seller peer group
        compute mean & standard deviation for average seller peer group
        compute mean & standard deviation for each registered country
            peer group
        compute mean & standard deviation for all sellers peer group
```

Continuing with FIG. 6, at box 196, the comparison module 78 computes a result by dividing the standard deviation value that is associated with a particular peer group and a particular attribute into the corresponding attribute information value for a particular seller. The comparison module computes meaningful results by making appropriate comparisons. For example, computing results for an average seller would require utilizing standard deviation values that are associated with the average seller peer group. As another example, computing results for a French seller would require utilizing standard deviation values that are associated with the French seller peer group. The comparison module iterates the computation for each category, for each seller, for each attribute value. For example, the following pseudo code may illustrate one embodiment:

```
for each category
    for each seller
        for each attribute
            if seller is an average seller then . . .
                if attribute information value associated with the seller
                    >= to standard deviation value associated with the
                    average seller peer group then divide the standard
                    deviation value into the attribute information
                    value and save the result; otherwise save 0.
            if seller is a power seller then . . .
                if attribute information value associated with the seller
                    >= to standard deviation value associated with the
                    power seller peer group then divide the standard
                    deviation value into the attribute information
                    value and save the result; otherwise save 0.
            if attribute information value associated with the seller >= the
                standard deviation associated with the corresponding
                registered country peer group then divide the standard
                deviation value into the attribute information value and
                save the result; otherwise save 0.
            if attribute information value associated with the seller >= the
                standard deviation associated with the all sellers peer
                group then divide the standard deviation value into the
                attribute information value and save the result; otherwise
                save 0.
```

At box 198, the detection module 180 reads through each category and each attribute, and sorts peer group sellers according to descending results into a referral list thereby organizing a presentation of the sellers from the most outlying behavior to the least outlying behavior. The referral list may subsequently be utilized by a computer algorithm or administrative personnel to identify possible fraud activity or to facilitate a customer segmentation support and promotion (e.g., invite a seller into a power seller group).

Figure 9:
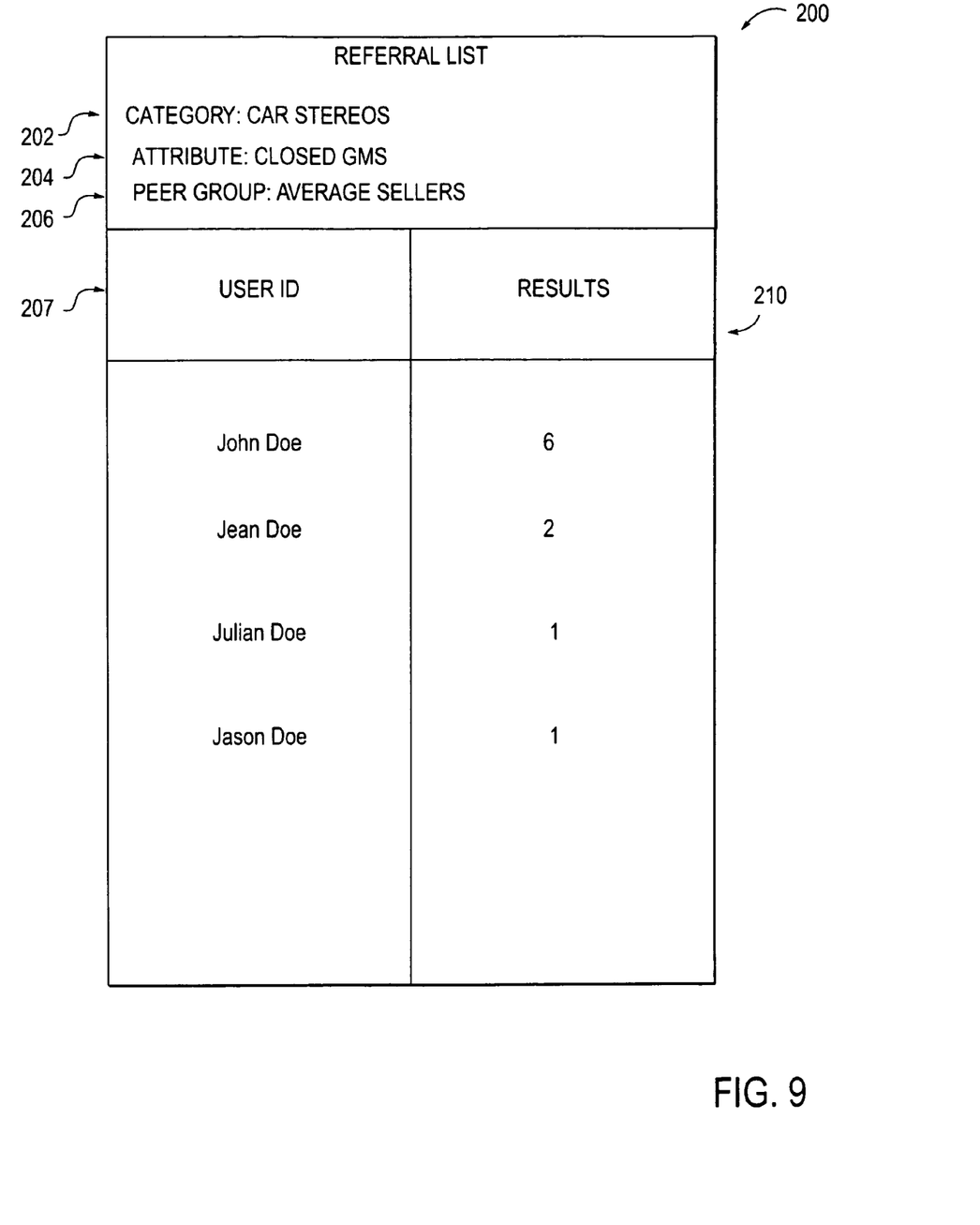

FIG. 9 illustrates a user interface screen 200, according to an exemplary embodiment of the present invention, depicting a referral list. The referral list identifies a category 202, an attribute 204, a peer group 206, a user id 207, and results (e.g., a number of standard deviations from the mean) for each user ID. The user interface screen 200 illustrates the category 202 as car stereos; the attribute 204 as closed gross margin sales; and, the user ID 207 as including several names each associated with results. John Doe may be characterized as exhibiting outlying behavior because his GMS for car stereos is 6 standard deviates greater than the average seller of car stereos and John is an average seller.

Figure 7:
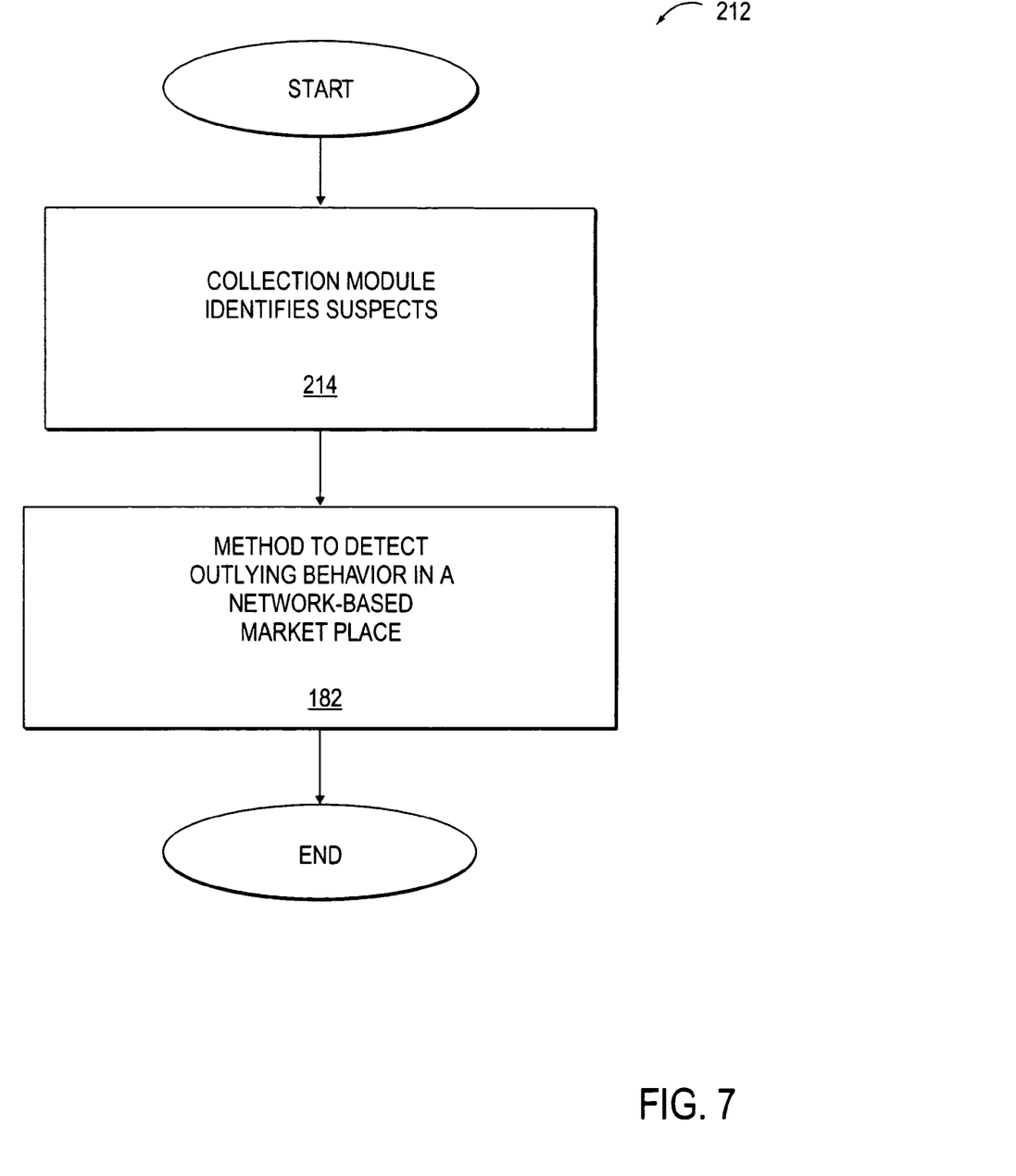
FIG. 7 is a flow chart illustrating a method, according to an exemplary embodiment of the present invention, to identify suspects more likely to exhibit outlying behavior.

FIG. 7 is a flow chart illustrating a method 212, according, to an exemplary embodiment of the present invention, to identify suspects process to detect possible outlying behavior.

At box 214, the collection 174 module generates a list of suspect sellers. The collection module 174 may identify suspect sellers by comparing attribute information for a particular seller for the current period to corresponding attribute information for the same seller for the previous period. For example, the collection module 174 may compare listings closed in the current week with listings closed in the previous week to generate a list of suspect sellers that may be sorted in descending order. The collection module 174 may then use the sorted list to determine which sellers will be fed as input to the method 182 to detect outlying behavior, (e.g., the first 100 suspects). Other embodiments may use other algorithms to generate the list of suspect sellers. For instance, attributes associated with the number of open listings, closed gross merchandise sales or total listing count may be utilized to generate the suspect list. Moreover, a combination of attributes may be utilized to generate the suspect list.

Figure 10:
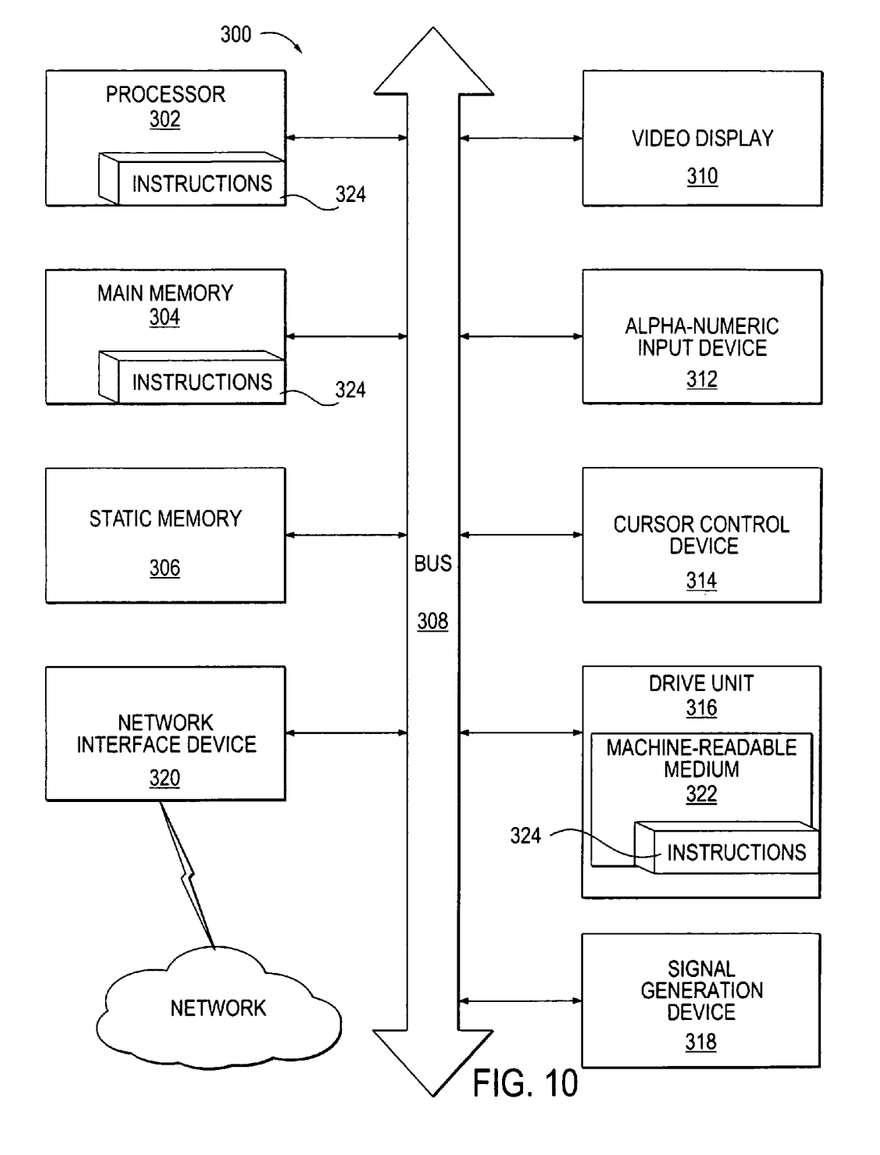
FIG. 10 illustrates a diagrammatic representation of a machine in the exemplary form of a computer system within which a set of instructions, for causing the machine to perform any one or more of the methodologies discussed herein, may be executed.

FIG. 10 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to detect outlying behavior in a network-based marketplace has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented system to detect outlying behavior in a network-based marketplace, the computer-implemented system comprising:
    a processor; and
    a medium executed by the processor, the medium including: a collection module to
        collect attribute information for a first plurality of sellers that includes a first seller, and
        store the attribute information in a storage device;
    a computing module to compute peer information associated with a second plurality of sellers, the second plurality of sellers comprising a subset of said first plurality of sellers, the peer information computed by combining together the attribute information of the second plurality of sellers;
    a comparison module to compare the peer information associated with the second plurality of sellers with attribute information for the first seller; and
    a detection module to detect outlying behavior by the first seller based on the comparison.

2. The computer-implemented system of claim 1, wherein the first plurality of sellers includes sellers that have listed an item for sale, via the network-based marketplace, in a first category of items.

3. The computer-implemented system of claim 1, wherein the attribute information includes at least one of information to open a listing, information to close a listing and feedback information.

4. The computer-implemented system of claim 3, wherein the detection module is to detect at least one of a fraudulent activity and a customer segmentation activity.

5. The computer-implemented system of claim 1, wherein the attribute information includes information pertaining to a plurality of attributes.

6. The computer-implemented system of claim 5, wherein the computing module is to compute the peer information as a standard deviation and a mean.

7. The computer-implemented system of claim 1, wherein the second plurality of sellers is an average seller peer group, and the comparison module is to classify the first seller as an average seller.

8. The computer-implemented system of claim 1, wherein the second plurality of sellers is a high value peer group, and the comparison to module is to classify first seller is classified as high value seller.

9. The computer-implemented system of claim 1, wherein the second plurality of sellers is associated with a first country, and the comparison module is to associate the first seller with the first country.

10. A method to detect outlying behavior in a network-based marketplace, the method comprising:
    collecting attribute information for a first plurality of sellers that includes a first seller;
    storing the attribute information in a storage device;
    computing peer information associated with a second plurality of sellers, the second plurality of sellers comprising a subset of said first plurality of sellers, the peer information computed by combining together the attribute information of the second plurality of sellers;
    using a processor to compare the peer information that is associated with the second plurality of sellers with attribute information that is for the first seller; and
    detecting outlying behavior by the first seller based on the comparison.

11. The method of claim 10, wherein the first plurality of sellers that have listed an item for sale, via the network-based marketplace, in a first category of items.

12. The method of claim 10, wherein the attribute information includes at least one of information associated with opening a listing, information associated with closing a listing and information associated with feedback.

13. The method of claim 12, wherein the detecting of outlying behavior is utilized to detect at least one of a fraudulent activity and a customer segmentation activity.

14. The method of claim 10, wherein the attribute information includes information pertaining to a plurality of attributes.

15. The method of claim 14, wherein the computing of the peer information includes computing a standard deviation and a mean.

16. The method of claim 10, wherein the second plurality of sellers is an average seller peer group and the first seller is an average seller.

17. The method of claim 10, wherein the second plurality of sellers is a high-value peer group and the first seller is classified as high value.

18. The method of claim 10, wherein the second plurality of sellers is associated with a first country, and the comparison module is to associate the first seller with the first country.

19. A machine readable medium storing a set of instructions that, when executed by the machine, cause the machine to:
    collect attribute information for a first plurality of sellers that includes a first seller;
    store the attribute information in a storage device;
    compute peer information associated with a second plurality of sellers, the second plurality of sellers comprising a subset of said first plurality of sellers, the peer information computed by combining the attribute information of the second plurality of sellers;
    compare the peer information that is associated with the second plurality of sellers with attribute information that is for the first seller; and
    detect outlying behavior by the first seller based on the comparison.

* * * * *